Patented Feb. 27, 1940

2,191,786

UNITED STATES PATENT OFFICE 2,191,786

CONTINUOUS PROCESS FOR MAKING ADIPIC ACID

Albert M. Aronow, Los Angeles, Calif., assignor of one-fifth to C. A. Miketta, Beverly Hills, Calif.

No Drawing. Application March 18, 1938,
Serial No. 196,747

9 Claims. (Cl. 260—531)

This invention relates to a process of manufacturing adipic acid and alkyl adipic acids in an efficient and rapid manner. It is particularly directed to a process in which conditions of addition and mixing of reagents, concentration, etc., permit continuous operation and production of high yields.

Adipic acid is an aliphatic dicarboxylic acid which has been made heretofore by oxidation of cyclohexanol with a strong oxidizing acid such as chromic or nitric acid. The prior processes involved boiling of a mixture of cyclohexanol and nitric acid, for example, or the slow addition of cyclohexanol to a body of concentrated nitric acid. The oxidizing reaction is exothermic and readily becomes dangerously explosive. Although some adipic acid is formed by these prior batch processes, large amounts of succinic and other acids are also formed and the processes are not satisfactory.

The present invention is based upon the discovery that the formation of succinic acid, etc., can be effectively prevented or rendered inconsequential and large yields of adipic acid obtained instead, by carrying out the oxidizing reaction under controlled conditions and in a continuous manner.

Generally stated, the process of this invention comprises forming an acid solution and maintaining a low concentration of oxidizing acid therein at all times, the cyclohexanol and concentrated acid being then continuously added to the solution and the reaction liquor continuously withdrawn. The volume of the mixture in the reaction zone is maintained in excess of the volume of reaction liquor withdrawn per minute. The amounts of cyclohexanol and acid introduced into the body in the reaction zone are sufficient to cause oxidation and also maintain the desired low acid concentration in the body of solution. Temperatures are maintained within certain low ranges as hereinafter more specifically set forth. Yields on the order of 95% of the theoretical are obtained by following such procedure.

It is an object of this invention, therefore, to disclose and provide a continuous process for the manufacture of adipic acid and alkyl adipic acids.

Another object is to provide conditions which permit the production of high yields of adipic acid with a minimum concomitant production of lower dicarboxylic acids.

A further object is to disclose and provide conditions of concentration, temperature and time whereby continuous manufacture of adipic acid in a facile and economical manner is assured.

These and other objects and advantages of the present invention will become apparent to those skilled in the art from the following detailed description of exemplary forms of procedure.

In starting the process, a body of reaction solution is formed in a reaction zone, this reaction solution containing 5% to 14% or preferably 6% to 10% of nitric acid, and a small amount of a catalyst preferably derived of a metal capable of changes in valence. Vanadium, mercury copper and molybdenum are examples. These metals, their oxides or salts may be present in from about 0.02% to 1.0% by weight of the reaction solution. The reaction zone in which the solution is formed (and maintained) may be any suitable form of apparatus provided its contents can be thoroughly agitated and maintained at a predetermined temperature. A kettle provided with heating and cooling coils, a valved discharge outlet, agitators and a hood or cover through which gaseous reaction products may be let off is satisfactory. Separate means for regulated feeding of cyclohexanol, concentrated nitric acid and additional catalyst to the body of reaction solution should also be provided. Since the form of apparatus used is not a part of this invention and the various elements are well known to chemical engineers, they will not be described in detail.

The reaction solution above defined is heated to 60° C.–105° C., preferably to between about 70° C. and 85° C. The production of adipic acid is then initiated by the regulated addition of cyclohexanol and concentrated nitric acid. 40% nitric acid may be used although 50% to 70% acid is preferred. The body of reaction solution is maintained in thorough agitation and the nitric acid is added in amount sufficient to combine with and oxidize the added cyclohexanol and leave the desired concentration of acid in the reaction mixture, i. e., leave a 5%–14% or 6%–10% acid content in the body of reaction solution. Additional catalyst may also be fed to the reaction zone, say at the rate of about 0.3 gm. per mol. of cyclohexanol, although this ratio can be materially varied without affecting the resulting oxidation in a significant manner. The temperature of the reaction mixture is maintained within the desired range (60° C.–105° C. or 70° C.–85° C.) during the performance of the process.

After the operation has begun as above stated, virtually continuous withdrawal of the reaction mixture from the reaction zone is initiated and such withdrawal is continued as long as the substantially continuous addition of reagents is being affected. The rate of withdrawal of the reaction mixture is correlated to the rate of addition of the reagents so that a substantially constant volume of reaction mixture is maintained in the reaction zone. The time during which reagents remain in the reaction zone will vary with the volume of the body kept in the reaction zone and the rate of addition. Reaction time need not exceed one minute so that the volume of the body can be equivalent to the average volume of reagents added per minute. Control of temperature in the reaction zone is facilitated when the reaction time is increased and larger body of reaction mixture is maintained in the reaction zone. For this reason the volume of the body of solution kept in the zone is preferably in excess of the volume withdrawn (or added) per minute, for example, five or more times the volume of the cyclohexanol and nitric acid added per minute, this assuring ample contact and reaction time.

The reaction generates nitric oxide which can be collected and used. The reaction zone may be kept at atmospheric or superatmospheric pressure, pressures being generally only sufficient to assure steady addition of reagents and such scrubbing of the reaction gases as may be desired. When superatmospheric pressures are employed, the temperature before referred to is to be increased in proportion to the pressure employed herein.

The reaction mixture withdrawn from the reaction zone is allowed to cool or is chilled to atmospheric temperature or to a temperature sufficient to precipitate the adipic acid which is then separated from the mother liquor in any suitable manner, as sedimentation and decantation filtration, centrifugal separation, etc. Chilling to about 30° C. or therebelow is advantageous. The mother liquor, containing between 5% and 14% of nitric acid, is sent to a still (preferably of the continuous column type) where it can be concentrated to 40% or higher nitric acid content, the water being discarded. This concentrated mother liquor is then preferably chilled to precipitate a further amount of adipic acid. Upon removal of the adipic acid, the concentrated acid liquid can be recycled to the reaction zone for use as a source of nitric acid in further operation of the process.

In practice, yields of adipic acid amounting to 90% to 95% of the theoretical are readily obtained. A body of the reaction mixture is permitted to remain in the reaction zone when the process is discontinued, this body being available for use the next time the process is started. The adipic acid produced may be purified in any suitable manner, as by recrystallization from water or any suitable solvent, such as acetone methyl ethyl ketone, etc.

It is to be understood that the process of this invention is not limited to the use of cyclohexanol since various alkyl substitution products of cyclohexanol may be used, these producing various alkyl adipic acids. The mode of operation herein disclosed is applicable to the manufacture of such alkyl adipic acids without material modification.

I claim:

1. A continuous process for manufacturing adipic acid comprising: forming a body of reaction solution containing from about 6% to 10% of nitric acid, and a metallic catalyst in a reaction zone, said body of reaction solution being at a temperature of between about 70° C. and 85° C., said catalyst being of a metal having a variable valency, continuously adding to said body of reaction solution cyclohexanol and concentrated nitric acid, while energetically agitating the same, in proportions sufficient to oxidize the cyclohexanol and still maintain a concentration of from 6% to 10% of nitric acid in the reaction solution, continuously withdrawing the reaction mixture from said reaction zone at a rate correlated to the rate at which cyclohexanol and nitric acid is added to said zone, the rate of withdrawal being adapted to permit oxidation of added cyclohexanol and maintain a body of reaction solution in said zone, the volume of body of reaction mixture maintained in said reaction zone being not less than five times the volume of reaction mixture withdrawn per minute, maintaining said reaction mixture at a temperature of between about 70° C. and 85° C. in said reaction zone during said continuous addition and withdrawal, chilling the withdrawn reaction mixture to a temperature below 30° C., separating the precipitated adipic acid from the acid mother liquid, distilling said acid mother liquid to remove water therefrom, chilling said concentrated mother liquid to precipitate further adipic acid therefrom, removing the precipitated adipic acid, and reusing the residual concentrated mother liquid in cyclic operation of the process.

2. A continuous process for manufacturing adipic acid, comprising: forming a body of reaction solution containing from about 6% to 10% of nitric acid and a metallic catalyst in a reaction zone, said body of reaction solution being at a temperature between about 70° C. and 85° C., said catalyst being of a metal having a variable valency, continuously adding to said body of reaction solution cyclohexanol and concentrated nitric acid, while energetically agitating the same, in proportions sufficient to oxidize the cyclohexanol and still maintain a concentration of from 6% to 10% of nitric acid in the reaction solution, continuously withdrawing reaction mixture from said reaction zone at a rate correlated to the rate at which cyclohexanol and nitric acid is added to said zone, the rate of withdrawal being adapted to permit oxidation of added cyclohexanol and maintain a body of reaction solution in said zone, maintaining said reaction mixture at a temperature of between about 70° C. and 85° C. in said reaction zone during said continuous addition and withdrawal, chilling the withdrawn reaction mixture, and separating the precipitated adipic acid from the acid mother liquid.

3. A continuous process of making adipic acids which comprises: forming a body of reaction solution containing from about 5% to 14% of nitric acid and a catalyst in a reaction zone, said body of reaction solution being heated to a temperature of between 60° C. and 105° C., continuously adding to said body of reaction solution with agitation cyclohexanol and concentrated nitric acid in proportions sufficient to oxidize the cyclohexanol and still maintain a concentration of from about 5% to 14% of nitric acid in the reaction solution, withdrawing reaction mixture from said reaction zone at a rate correlated to the rate at which cyclohexanol and nitric acid is added to said zone, the rate of withdrawal being adapted to permit oxidation of added cyclohexanol and maintain a body of reaction solution in said zone, maintaining said reaction mixture at a temperature of between about 60° C. and 105° C. in said reaction zone during said continuous addition and withdrawal, chilling the withdrawn reaction mixture to a temperature sufficient to precipitate adipic acid therefrom, and separating the precipitated adipic acid from the acid mother liquid.

4. A continuous process of making adipic acids which comprises: forming a body of reaction solution containing from about 6% to 10% of nitric acid and a catalyst in a reaction zone, said body of reaction solution being heated to a temperature of between 60° C. and 105° C., continuously adding to said body of reaction solution with agitation cyclohexanol and concentrated nitric acid in proportions sufficient to oxidize the cyclohexanol and still maintain a concentration of from about 6% to 10% of nitric acid in the reaction solution, withdrawing reaction mixture from said reaction zone at a rate correlated to the rate at which cyclohexanol and nitric acid is added to said zone, the rate of withdrawal being adapted to permit oxidation of added cyclohexanol and maintain a body of reaction solution in said zone, maintaining said reaction mixture at a temperature of between about 60° C. and 105° C. in said reaction zone during said continuous addition and withdrawal, chilling the withdrawn reaction mixture to a temperature sufficient to precipitate adipic acid therefrom, and separating the precipitated adipic acid from the acid mother liquid.

5. In a continuous process of making adipic and alkyl substituted adipic acids, the step of continuously oxidizing a member of the group consisting of cyclohexanol and alkyl substitution products thereof at a concentration of from about 4% to 14% of nitric acid and at a temperature of between 60° C. and 105° C.

6. In a continuous process of making adipic and alkyl substituted adipic acids, the step of continuously oxidizing a member of the group consisting of cyclohexanol and alkyl substitution products thereof in the presence of a suitable catalyst at a concentration of from about 4% to 14% of nitric acid and at a temperature of between 70° C. and 85° C.

7. In a continuous process of making adipic and alkyl substituted adipic acids, the step of continuously oxidizing a member of the group consisting of cyclohexanol and alkyl substitution products thereof in the presence of a suitable catalyst at a concentration of from about 6% to 10% of nitric acid and at a temperature of between 70° C. and 85° C.

8. In a continuous process of making adipic and alkyl substituted adipic acids, the steps of: forming a body of reaction solution containing an oxidizing acid in a reaction zone, continuously adding a member of the group consisting of cyclohexanol and alkyl substituted products thereof with agitation to said body of reaction solution, continuously introducing an oxidizing acid into said reaction zone in quantity sufficient to maintain oxidizing conditions in said reaction zone, and continuously withdrawing the reaction mixture containing adipic acid from said reaction zone at a rate correlated to the rate of additions to said zone so as to maintain a body of reaction solution in said zone.

9. A process for the production of adipic acid which comprises continuously introducing cyclohexanol into a nitric acid-containing solution maintained at a temperature between 70° C. and 105° C., maintaining the concentration of the nitric acid in said solution between 5% and 14% by continuously introducing fortifying nitric acid, continuously removing the crude reaction mixture and recovering adipic acid therefrom.

ALBERT M. ARONOW.